United States Patent [19]

Dietz et al.

[11] 4,219,365

[45] Aug. 26, 1980

[54] PIGMENT DISPERSIONS AND THEIR USE FOR THE PIGMENTING OF HYDROPHILIC AND HYDROPHOBIC MEDIA

[75] Inventors: Erwin Dietz, Kelkheim; Max Grossmann, Frankfurt am Main; Robert Gutbrod, Frankfurt am Main; Michael Maikowski, Frankfurt am Main, all of Fed. Rep. of Germany

[73] Assignee: Hoechst Aktiengesellschaft, Frankfurt, Fed. Rep. of Germany

[21] Appl. No.: 973,722

[22] Filed: Dec. 27, 1978

[30] Foreign Application Priority Data

Dec. 31, 1977 [DE] Fed. Rep. of Germany ....... 2759203

[51] Int. Cl.² ............................................. C09C 1/00
[52] U.S. Cl. ........................... 106/308 Q; 106/308 N; 106/308 S
[58] Field of Search ............ 106/308 Q, 308 N, 308 S

[56] References Cited

U.S. PATENT DOCUMENTS

| | | | |
|---|---|---|---|
| 3,067,053 | 12/1962 | Tarantino | 106/308 Q |
| 3,094,499 | 6/1963 | Gassmann et al. | 106/308 Q |
| 3,210,209 | 10/1965 | Jones et al. | 106/308 Q |
| 3,888,828 | 6/1975 | Grossman | 260/29.3 |

*Primary Examiner*—James Poer
*Attorney, Agent, or Firm*—Curtis, Morris & Safford

[57] ABSTRACT

Stable dispersions of pigments are obtained by finely distributing inorganic and/or organic pigments in water and/or agents preventing or retarding the drying-up of the dispersions containing condensation products of aromatic hydroxy compounds and alkanals as well as surfactants, said condensation products and surfactants containing aliphatic carbon chains of more than 5 carbon atoms. The dispersions are compatible with hydrophilic and hydrophobic media.

14 Claims, No Drawings

PIGMENT DISPERSIONS AND THEIR USE FOR THE PIGMENTING OF HYDROPHILIC AND HYDROPHOBIC MEDIA

The present invention relates to pigment dispersions and their use for the pigmenting of hydrophilic and hydrophobic media.

For the preparation of pigment dispersions, which are suitable for the pigmenting of both hydrophilic and hydrophobic media, a great number of non-ionic and anionic surfactants and—to a smaller extent—also cationic surfactants have been used. There has been described, for example, the use of alkyl sulfates and alkyl sulfonates, alkyl-benzene sulfonates and ethoxylated alkyl phenols, fatty acids, fatty alcohols and fatty amines. However, in the case of many pigments, the dispersions prepared with these surfactants no longer meet today's requirements regarding the stability to flocculation towards dispersion paints containing cellulose ethers, the compatibility with hydrophobic paint systems, such as alkyd resins and outdoor paints, and the high pigment concentration and tinctorial strength in conjunction with favorable rheological properties.

The subject of the present invention is pigment dispersions for the pigmenting of hydrophilic and hydrophobic media, which consist of
(a) inorganic and/or organic pigments,
(b) condensation products from aromatic hydroxy compounds and alkanals, said condensation products containing aliphatic carbon chains of more than 5 carbon atoms,
(c) surfactants containing aliphatic carbon chains of more than 5 carbon atoms,
(d) water and/or compounds miscible with water, which prevent or retard the drying-up of the dispersion, as well as
(e) optionally further common additives, such as preservatives and foam-reducing substances.

The pigment dispersions preferably contain condensation products of aromatic hydroxy compounds—termed "phenols" for short in the following—and alkanals with recurring structural units of the general formula

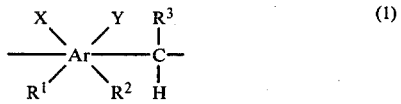

in which
Ar represents a mono- or polycyclic aromatic ring system, preferably benzene or naphthalene,
X is an OH group which may also be etherified or esterified,
Y is a hydrogen atom or any substituent not preventing the condensation reaction, such as $-R^4$, $-OR^4$, halogen, $-COR^4$, $-COOR^4$, $-CONR^4R^5$ or $-NR^4COR^5$, $R^4$ and $R^5$ standing for H or short-chain alkyl radicals of 1 to 4 carbon atoms,
$R^1$, $R^2$ and $R^3$ represent independently of one another hydrogen or alkyl, alkenyl or alkapolyenyl radicals with up to 30 carbon atoms, these radicals optionally being interrupted by $-O-$, $-S-$, $-NR^4-$, $-CO-$, $-COO-$, $-CONR^4-$ or arylene, especially phenylene, and optionally carrying halogen atoms, hydroxy or carboxy groups, however, at least one of the radicals, $R^1$, $R^2$ or $R^3$ per two recurrent structural units of the formula (1) consisting of or containing an aliphatic carbon chain with more than 5 carbon atoms.

Preference is given in particular to condensation products which are derived from alkyl phenols with alkyl radicals having more than 5 carbon atoms and formaldehyde and to those which are derived from phenols or naphthols and alkanals with more than 5 carbon atoms.

By the term of "carbon chain" there is to be understood an uninterrupted arrangement of carbon atoms with single and double bonds, which arrangement may also be cyclic and may contain substituents, such as hydroxy.

The condensation products (b), preferably those with structural units of the formula (1), may be obtained in known manner, for example by the reaction of phenols with aldehydes or aldehyde-yielding compounds at a temperature of from 20° to 180° C., preferably from 50° to 150° C., in the presence of an acidic catalyst. In this process, the reactants, i.e. phenol and aldehyde, are employed preferably in a molar ratio of from 1:1 to 2:1. After a reaction period of from 3 to 20 hours the water being formed in the reaction is distilled off first under normal pressure and subsequently in vacuo. Preferred condensation products have an average molecular weight of between 400 and 5,000.

Suitable phenols are, for example, unsubstituted phenol, cresols, ethyl phenols, propyl phenols, butyl phenols, dialkyl phenols with alkyl groups of 1 to 4 carbon atoms and especially phenols with longe-chain alkyl radicals, such as octyl phenols, nonyl phenols, dodecyl phenols and dinonyl phenols, 1-naphthol, 2-naphthol, alkyl naphthols with alkyl groups of 1 to 4 carbon atoms, tetrahydronaphthols, 4-hydroxybiphenyl, 4,4'-dihydroxybiphenyl, hydroquinone, resorcinol, pyrocatechol, bis-(4-hydrophenyl)-methane, 2,2-bis-(4-hydroxyphenyl)-propane, chlorophenols, 4-acetamidophenol or 4-hydroxyacetophenone.

As aldehydes there may be mentioned, for example, formaldehyde and formaldehyde-yielding compounds, such as paraformaldehyde, trioxan and tetraoxamethylene, acetaldehyde and paraldehyde, propionaldehyde, butyraldehyde, valeraldehyde, enanthaldehyde and higher-molecular linear and branched aldehydes, such as lauric aldehyde, palmitic aldehyde, stearic aldehyde and aldehydes from the oxosynthesis. The phenols as well as the aldehydes may be employed by themselves or in admixture.

The phenolic OH groups of the condensation products with structural units of the formula (1) may be converted completely or partially into the corresponding ethers or esters. For this purpose there are suitable, for example, alkyl halides, alkyl sulfates and alkylene oxides and/or acid halides and acid anhydrides.

The pigment dispersions of the invention may contain inorganic and/or organic pigments. As inorganic pigments there are suitable, for example, white and color pigments, such as titanium dioxides, zinc sulfides, cadmium sulfides or selenides, iron oxides, chromium oxides, mixed oxides of cobalt and aluminum, chromate pigments, nickel or chromium titanium yellow, as well as extender pigments and carbon blacks.

Suitable organic pigments are, for example, azo pigments, azamethines, azaporphines, quinacridones, flavanthrone, anthanthrone and pyranthrone compounds, derivatives of naphthalene-tetracarboxylic acid, of perylenetetracarboxylic acid, of thioindigo, dioxazine and of tetrachloroisoindolinone, laked pigments, such as Mg, Ca, Ba, Al, Mn, Co and Ni lakes of dyestuffs containing acid groups, as well as corresponding pigment mixtures.

For the preparation of the pigment dispersions of the invention there may be used all known surfactants which contain aliphatic carbon chains having more than 5 carbon atoms. Anionic and non-ionic surfactants with medium-to long-chain hydrocarbon radicals have proved to be particularly appropriate. Of the great number of these compounds, only a few selected representatives shall be mentioned, such as alkyl sulfates, alkyl sulfonates, alkyl phosphates and alkyl-benzene sulfonates, especially lauryl sulfates, stearyl sulfates, dodecyl sulfonates, octadecyl phosphates, oleyl phosphates, dodecyl-benzene sulfonates; fatty acids and the salts thereof, condensation products of fatty acids and taurine or hydroxyethane-sulfonic acid, alkoxylation products of alkylphenols, fatty alcohols, fatty amines, fatty acids and fatty acid amides, especially reaction products of octylphenol, nonylphenol, dodecylphenol, lauryl alcohol, coconut oil alcohol, stearyl alcohol, oleyl alcohol, coconut oil fatty amine, tallow fatty amine, stearylamine, oleylamine, coconut oil fatty acid, lauric acid, stearic acid or oleic acid with from 1 to 30 mols, preferably from 5 to 20 mols of ethylene oxide as well as reaction products of ethoxylated alkylphenols and fatty alcohols with chlorosulfonic acid and phosphorus oxychlorides. The above surfactants may be used by themselves or in admixture, especially mixtures of anionic and non-ionic surfactants being appropriate.

As additives to the pigment dispersions which prevent or retard the drying-up of said dispersions there are suitable above all those which are completely or partly miscible with water, such as polyhydric alcohols and their ethers, for example glycols, glycol ethers and acid amides, especially ethylene-glycol, propylene-glycol, butylene-glycol, hexylene-glycol, diethylene-glycol, dipropylene-glycol, polyethylene-glycols, polypropylene-glycols, methyl diglycol, ethyl diglycol, glycerol, trimethylol propane, pentaerythritol, formamide, and N-methyl-pyrrolidone-(2). These additives may be used by themselves or in admixture with one another or with water.

The preparation of the dispersions is effected in known manner depending on the hardness of the pigment grains used, for example by means of saw tooth stirrers (dissolvers), rotor-stator mills, ball mills, agitator bead mills (sand or bead mills), in high-speed turbulent mixers, kneading units or on roller mills. Prior to the dispersing process or subsequent to the same, auxiliaries, such as preservatives or foam-reducing substances, may be added to the pigment dispersions.

Preferred pigment dispersions contain from 5 to 80% by weight of pigment, from 0.1 to 7% by weight, preferably from 0.3 to 3% by weight, of compounds with recurring structural units of the formula (1), from 3 to 30% by weight, preferably from 5 to 20% by weight, of surfactants, as well as from 20 to 90% by weight of water and/or additives retarding the drying-up. Besides, the pigment dispersions may contain common additives, such as preservatives and foam-reducing substances.

As compared with common pigment dispersions, the pigment dispersions of the invention are distinguished by an excellent compatibility with both hydrophilic and hydrophobic media. There is to be mentioned in particular the high stability to flocculation in cellulose ether-containing plastics dispersions. The composition according to the invention of the dispersions makes it possible to produce the full tinctorial strength and brilliancy of the pigments in the dispersion process and to stabilize said pigments in the pigment dispersions over a prolonged period of storage. Besides, the pigment dispersions show very good rheological properties, even with a high pigment content, as well as a particularly favorable distributability in the most various application media.

From the great number of hydrophilic and hydrophobic media, two media each are selected for purposes of examination, in order to prove the wide field of application and the high stability to flocculation. This selection merely serves to illustrate the suitability of the products and does in no way represent a limitation of the numerous possibilities of application of the pigment dispersions of the invention.

Test media (I) Emulsion paint on the basis of polyvinyl acetate containing 20 parts of stabilized rutile pigment, 24 parts of extender pigments (predominantly dolomite), 40 parts of a commercial polyvinyl acetate dispersion suitable for emulsion paints ($^{(R)}$Mowilith DM2HB) and 0.16 part of a methylhydroxyethyl cellulose which has an average viscosity of 2 Pas in a 2% aqueous solution at 20° C. The remaining 15.84 parts are made up by water and the usual stabilizing agents.

(II) Emulsion paint on the basis of acrylic resin containing 20 parts of stabilized rutile pigment, 24 parts of extender pigments (predominantly dolomite), 40 parts of a commercial acrylic resin dispersion ($^{(R)}$Rhoplex AC34) suitable for emulsion paints, as well as 0.33 part of a methylhydroxyethyl cellulose having an average viscosity of 4 Pas in a 2% aqueous solution at 20° C., the balance of 15.67 parts being water and the common stabilizing agents.

(III) Outdoor paint on the basis of polyvinyl-toluene acrylate containing 15 parts of stabilized rutile pigment, 34 parts of extender pigments (predominantly dolomite), 7 parts of a commercial vinyl-toluene acrylate copolymer suitable for outdoor paints ($^{(R)}$Pliolite VTAC-L), 14 parts of a 10% solution of a modified commercial vinyl-toluene acrylate copolymer (Pliolite AC-3) suitable for outdoor paints in a mixture of aromatic and aliphatic hydrocarbons, and 30 parts of a mixture of a stabilizing agent, chloroparaffin and white spirit.

(IV) Air-drying alkyd resin lacquer containing 30 parts of stabilized rutile pigment, 37.5 parts of long-oil alkyd resins on the basis of vegetable fatty acids, 32.5 parts of a mixture of drying substances, stabilizers, white spirit and crystal oil.

For the suitability tests the pigment preparations specified in the following Examples are introduced while stirring by hand by means of a glass rod provided with a rubber cap into a hydrophilic and a hydrophobic test medium each. The concentration of the pigment dispersion is chosen in such a manner that in the colored test medium a proportion of the white pigment to the color pigment of 50:1 is obtained. After a stirring period of 3 minutes the colored test medium is applied by a film applicator on white art printing cardboard.

In order to test the stability to flocculation and the distributability, part of the film is rubbed with a brush or with the finger after drying for a short period. If the pigment dispersion was difficult to distribute in the test medium to give a homogeneous mixture, or if a flocculation process took place when stirring the pigment dispersion into the test medium, agglomerated pigment particles are at least partly deagglomerated by the shearing forces exerted on the film. As a result the rubbed area has a more intense color than the area which has not been rubbed. This "rub-out" test is suitable in particular as a simple test method for shading (tinting) pastes.

The following Examples serve to illustrate the invention, the parts being by weight.

The condensation products employed which have been obtained from aromatic hydroxy compounds and alkanals were prepared in accordance with German Pat. No. 2,132,405 (U.S. Pat. No. 3,888,828). As acid catalyst there has been used dodecyl-benzene-sulfonic acid. Said condensation products were prepared from the following compounds:

(A) 92.4 Grams of nonylphenol and 8.4 g of paraformaldehyde
(B) 92.4 g of nonylphenol and 10.8 g of paraformaldehyde
(C) 91.7 g of dodecylphenol and 9.0 g of paraformaldehyde
(D) 82.4 g of octylphenol and 10.5 g of paraformaldehyde
(E) 34.6 g of dinonylphenol, 66.0 g of nonylphenol and 10.5 g of paraformaldehyde
(F) 66.0 g of nonylphenol, 9.4 g of phenol and 10.5 g of paraformaldehyde
(G) 88.0 g of nonylphenol, 14.4 g of p-cresol and 14.0 g of paraformaldehyde
(H) 88.0 g of nonylphenol, 17.2 g of 4-chlorophenol and 14.0 g of paraformaldehyde
(I) 88.0 g of nonylphenol, 14.8 g of hydroquinone and 14.0 g of paraformaldehyde
(K) 66.0 g of nonylphenol, 17.0 g of 4-hydroxy-biphenyl and 10.5 g of paraformaldehyde
(L) 66.0 g of nonylphenol, 22.8 g of 2,2-bis-(4-hydroxyphenyl)-propane and 10.5 g of paraformaldehyde
(M) 66.0 g of nonylphenol, 14.4 g of naphthol-(2) and 10.5 g of paraformaldehyde
(N) 43.2 g of naphthol-(1) and 36.8 g of lauric aldehyde
(O) 77.0 g of nonylphenol, 6.0 g of paraformaldehyde and 11.4 g of enanthaldehyde.

Besides, the OH groups of condensation product B were etherified by the addition of 1 mol of ethylene oxide per equivalent of OH groups (condensation product P).

EXAMPLE 1

In a double trough kneader, 480 parts of C.I. Pigment Orange 5 (Colour Index No. 12 075) are kneaded together with 15 parts of condensation product, 105 parts of an addition product of 10 mols of ethylene oxide to 1 mol of oleyl alcohol and about 105 parts of altogether 200 parts of ethylene glycol for 1 hour. Subsequently the kneaded composition is diluted by adding the remaining ethylene glycol, 198 parts of water and 2 parts of preservative. The following Table indicates the influence of different condensation products on the rheological properties, the distributability and the stability to flocculation in test media I and IV. These properties have been judged by marks from 1 to 6:
1 = excellent,
2 = very good,
3 = good,
4 = moderate,
5 = poor,
6 = very poor.

| Example No. | condensation product | rheological properties | distributability and stability to flocculation to medium I | medium IV |
|---|---|---|---|---|
| 1a | A | 5 viscous paste | 3 | 4 |
| 1b | B | 1 | 1 | 2 |
| 1c | C 1 | 1 | 3 | |
| 1d | D | 2 | 1 | 3 |
| 1e | E | 1 | 1 | 3 |
| 1f | F | 3 | 1 | 2 |
| 1g | G | 2 | 1 | 2 |
| 1h | H | 2 | 1 | 2 |
| 1i | I | 2 | 1 | 3 |
| 1k | K | 1 | 1 | 2 |
| 1l | L | 1 | 1 | 2 |
| 1m | M | 1 | 1 | 1 |
| 1n | N | 2 | 1 | 1 |
| 1o | O | 1 | 1 | 3 |
| 1p | P | 3 | 1 | 2 |
| Comparison tests: | | | | |
| 1q | nonylphenol | 6 non-flowing paste | 4 | 6 |
| 1r | adduct of 10 mols of ethylene oxide to 1 mol of oleyl alcohol | 6 non-flowing paste | 4 | 5 |

In most cases, the color intensity of the dyeings of Comparison Examples 1q and 1r is markedly lower than that of the dyeings of Examples 1a to 1p.

EXAMPLE 2a

400 Parts of C.I. Pigment Yellow 97 (Colour Index No. 11 767) are dispersed in a double trough kneader in 20 parts of condensation product H, 80 parts of an addition product of 10 mols of ethylene oxide onto 1 mol of nonylphenol, and 214 parts of water. After a dispersing period of 1 hour said mixture is diluted with 34 parts of water, 250 parts of ethylene glycol and 2 parts of preservative to give a dispersion with excellent rheological properties. This dispersion shows an excellent stability to flocculation in medium II as well as a very good stability to flocculation in medium III and in either medium leads to dyeings that are marked by a high tinctorial strength and brilliancy.

EXAMPLE 2b

If in Example (2a) 80 parts of ethylene glycol are replaced by 80 parts of glycerol, a dispersion is obtained whose properties are almost as favorable as those of Example (2a).

COMPARISON TEST 2c

If in Example (2a) the 20 parts of condensation product H are replaced by 17 parts of nonylphenol and 3 parts of 4-chlorophenol, a non-flowing paste is obtained which cannot be worked into media II and III but with great difficulty. The dyeings are weaker than those of Example (2a).

EXAMPLE 3

In a double trough kneader, 400 parts of C.I. Pigment Red 112 (Colour Index No. 12 370) are kneaded for 1 hour with 10 parts of condensation product N, 10 parts of sodium lauryl sulfate, 80 parts of an addition product of 10 mols of ethylene oxide to 1 mol of nonylphenol and 125 parts of ethylene glycol. Subsequently the kneaded composition is diluted by adding 105 parts of ethylene glycol, 268 parts of water and 2 parts of preservative, to give a particularly free-flowing dispersion which shows a very good distributability and stability to flocculation in media II and III. The dyeings are marked by a high color strength and brilliancy.

EXAMPLE 4a

450 Parts of C.I. Pigment Green 7 (Colour Index No. 74 260) are dispersed in a double trough kneader for 1 hour, while adding 10 parts of condensation product B, 100 parts of an addition product of 10 mols of ethylene oxide onto 1 mol of nonylphenol, and 91 parts of ethylene glycol. This kneaded composition is diluted by adding 29 parts of ethylene glycol, 50 parts of formamide, 50 parts of N-methyl-pyrrolidone-(2), 218 parts of water and 2 parts of preservative, to give a dispersion having excellent rheological properties. Said dispersion can be introduced in a particularly easy manner into media II and III, while stirring, and it does not show the slightest flocculation phenomena during this process. The dyeings show a high color strength and brilliancy.

EXAMPLE 4b

Comparable results are obtained, if in Example (4a) the 50 parts of formamide and 50 parts of N-methyl-pyrrolidone-(2) are replaced by 100 parts of 1,2-propylene glycol or 100 parts of diethylene glycol or by 70 parts of hexylene glycol and 30 parts of ethylene glycol.

EXAMPLE 5

In accordance with Example (4a), a pigment dispersion is prepared from 400 parts of C.I. Pigment Red 168 (Colour Index No. 59 300), 20 parts of condensation product B, 40 parts of an addition product of 8 mols of ethylene oxide to 1 mol of oleyl alcohol, 20 parts of an addition product of 10 mols of ethylene oxide onto 1 mol of stearyl alcohol, 40 parts of an addition product of 13 mols of ethylene oxide onto 1 mol of oleyl alcohol, 240 parts of ethylene glycol and 240 parts of water. This pigment dispersion has excellent rheological properties. It can be distributed in a really easy manner in test media II and IV, by which process full and brilliant dyeings are obtained which do not show any flocculation phenomena.

EXAMPLE 6

In accordance with Example (4a), a pigment dispersion is prepared which contains the following constituents: 400 Parts of a furnace black which has a specific surface of 72 m²/g, 20 parts of condensation product N, 80 parts of an addition product of 10 mols of ethylene oxide onto 1 mol of oleyl alcohol, 250 parts of ethylene glycol, 248 parts of water and 2 parts of preservative. This carbon black dispersion having most favorable rheological properties can easily be distributed in test media I and III. In the rub-out test the full dyeings do not show any differences in tinctorial strength in test medium I, and only very slight differences in test medium III, between those areas which have been rubbed subsequently and those which have not.

EXAMPLE 7

In a double trough kneader, 480 parts of C.I. Pigment Orange 5 (Colour Index No. 12 075) are kneaded for 1 hour with 15 parts of condensation product K, 100 parts of the sodium salt of dodecyl-benzene-sulfonic acid, 20 parts of diethylene glycol, 132 parts of ethylene glycol and 50 parts of water, and the mixture is subsequently diluted with 48 parts of ethylene glycol, 153 parts of water and 2 parts of preservative, to give a dispersion having very favorable flow properties. Said dispersion can easily be worked into test media II and IV, thus yielding full and brilliant dyeings which do not show any flocculation phenomena.

What is claimed is:

1. A pigment dispersion comprising
   (a) a tinctorially effective amount of an organic and/or inorganic pigment,
   (b) water and/or a water-miscible compound as a dispersion medium for said pigment,
   (c) a condensation product of an aromatic hydroxy compound and an alkanol,
   (d) a surfactant containing an aliphatic carbon chain of more than 5 carbon atoms, said condensation product and surfactant being present in amounts effective to disperse said pigment in said dispersion medium, said condensation product having an average molecular weight of 400 to 5000 and consisting of recurring units of the formula

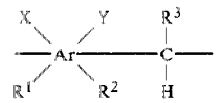

wherein Ar is benzene or naphthalene; X is hydroxy, etherified or esterified hydroxy; Y is hydrogen, $-R^4$, $-OR^4$, halogen, $-CO-R^4$, $-COOR^4$, $-CONR^4R^5$ or $-NR^4COR^5$, $R^4$ and $R^5$ standing, independently of each other, for hydrogen and alkyl of 1 to 4 carbon atoms; $R^1$, $R^2$ and $R^3$ are, independently of each other, hydrogen, alkyl, alkenyl or alkapolyenyl each having up to 30 carbon atoms, the carbon chains of which are uninterrupted or interrupted by $-O-$, $-S-$, $-NR^4-$, $-CO-$, $-COO-$, $-CONR^4-$ or phenylene, and which are unsubstituted or substituted by halogen, hydroxy or carboxy; with the proviso that per each two such recurring units at least one of $R^1$, $R^2$ and $R^3$ contains an aliphatic chain of more than 5 carbon atoms.

2. A pigment dispersion as claimed in claim 1, which contains a preservative and/or a foam-reducing substance.

3. A pigment dispersion as claimed in claim 1, which contains a condensation product of an aromatic hydroxy compound and an alkanal deriving from an alkylphenol with an alkyl radical of more than 5 carbon atoms and formaldehyde.

4. A pigment dispersion as claimed in claim 1, which contains a condensation product of an aromatic hydroxy compound and an alkanal deriving from a phenol or a naphthol and an alkanal of more than 5 carbon atoms.

5. A pigment dispersion as claimed in claim 1, which contains as a surfactant a non-ionic surfactant.

6. A pigment dispersion as claimed in claim 5, which contains as a non-ionic surfactant an addition product of 5 to 20 mols of ethylene oxide onto an alkylphenol and/or a fatty alcohol.

7. A pigment dispersion as claimed in claim 1, which contains as a surfactant an anionic surfactant.

8. A pigment dispersion as claimed in claim 7, which contains as an anionic surfactant an alkyl sulfate, alkyl sulfonate and/or alkyl-benzene sulfonate.

9. A pigment dispersion as claimed in claim 1, which contains as a surfactant a mixture of an anionic and a non-ionic surfactant.

10. A pigment dispersion as claimed in claim 1, which contains a polyhydric alcohol and/or an acid amide as a compound that is miscible with water and prevents or retards the drying-up.

11. A pigment dispersion as claimed in claim 1, containing 5 to 80% by weight of pigment,
    0.1 to 7% by weight of said condensation product,
    3 to 30% by weight of said surfactant and
    20 to 90% by weight of water and/or said water miscible compound.

12. A pigment dispersion as claimed in claim 11, containing 0.3 to 3% by weight of condensation product.

13. A pigment dispersion as claimed in claim 11, containing 5 to 20% by weight of surfactant.

14. A process for pigmenting hydrophilic or hydrophobic media which comprises incorporating into said media a pigment dispersion as claimed in claim 1.

* * * * *